United States Patent [19]

Baker et al.

[11] Patent Number: 4,757,333

[45] Date of Patent: Jul. 12, 1988

[54] APPARATUS FOR GENERATING COLOR TEXT AND GRAPHICS ON PHOTOGRAPHIC MEDIA

[75] Inventors: Philip G. Baker, Cupertino; Walter Conti, Palo Alto; Aleksey Novicov, Palo Alto; Paul N. Barsley, Palo Alto, all of Calif.

[73] Assignee: Presentation Technologies, Inc., Santa Clara, Calif.

[21] Appl. No.: 96,771

[22] Filed: Sep. 11, 1987

Related U.S. Application Data

[63] Continuation of Ser. No. 785,466, Oct. 8, 1985, abandoned.

[51] Int. Cl.$^4$ .............................................. B41B 15/00
[52] U.S. Cl. ....................................... 354/13; 354/15
[58] Field of Search .......................... 354/10, 12–16, 354/18, 19, 463, 227.1; 364/523; 355/39, 40; 350/332; 340/765, 767

[56] References Cited

U.S. PATENT DOCUMENTS

| | | | |
|---|---|---|---|
| 3,207,051 | 9/1965 | Cooper et al. | 354/12 X |
| 3,576,364 | 4/1971 | Zanoni | 353/28 |
| 3,626,824 | 12/1971 | Kolb | 95/4.5 |
| 3,668,984 | 6/1972 | Rosin | 95/4.5 |
| 3,688,672 | 9/1972 | Hanson et al. | 95/4.5 |
| 3,722,996 | 5/1973 | Fox | 355/53 |
| 3,819,854 | 6/1974 | Kolb | 178/6.7 R |
| 3,836,243 | 9/1974 | Melchior | 353/122 |
| 3,959,802 | 5/1976 | Plaot | 354/12 |
| 3,972,610 | 8/1976 | Gross | 355/7 |
| 3,986,022 | 10/1976 | Hyatt | 354/227.1 |
| 3,988,063 | 11/1976 | McNair et al. | 355/40 |
| 4,047,813 | 9/1977 | Spence-Bate | 355/95 |
| 4,087,175 | 5/1978 | Johnson | 355/40 |
| 4,148,572 | 4/1979 | Linde | 354/15 |
| 4,155,642 | 5/1979 | Lacombat | 355/53 |
| 4,161,709 | 7/1979 | Spence-Bate | 355/58 |
| 4,174,174 | 11/1979 | Hunter, Jr. et al. | 355/39 |
| 4,198,157 | 4/1980 | Johnson | 355/40 |
| 4,222,641 | 9/1980 | Stolov | 353/84 |
| 4,230,409 | 10/1980 | Zoeke | 354/10 |
| 4,277,190 | 7/1981 | Rudy et al. | 400/582 |
| 4,294,524 | 10/1981 | Stolov | 353/84 |
| 4,360,264 | 11/1982 | Baker et al. | 355/40 |
| 4,368,963 | 1/1983 | Stolov | 353/31 |
| 4,395,116 | 7/1983 | Patton, III et al. | 355/32 |
| 4,410,887 | 10/1983 | Stolov et al. | 340/784 |
| 4,414,565 | 11/1983 | Shanks | 358/89 |
| 4,427,279 | 1/1984 | Edelstein et al. | 354/107 |
| 4,443,819 | 4/1984 | Funada et al. | 358/236 |
| 4,444,490 | 4/1984 | Stark et al. | 355/40 |
| 4,516,842 | 5/1985 | Trombert | 354/15 |
| 4,536,014 | 8/1985 | Boutaleb et al. | 283/83 |

OTHER PUBLICATIONS

Microstepping of Step Motors, Superior Electric Company, (1978), pp. 1–22.

Primary Examiner—W. B. Perkey
Attorney, Agent, or Firm—Lyon & Lyon

[57] ABSTRACT

Apparatus for generating color slides or other photographic media containing character fonts and graphics images contains one or more character font sets on a transparent drum or disk carrier. Lines of text are entered by keyboard or the like into a data processor which stores them as character and position information. This information is then used to position and expose images of the selected characters from the carrier onto photographic media by use of a moveable lens and a shutter. An additional moveable drum or disk may be used to provide different background color as well as character color. By holding the shutter open while a character or arbitrary shape is illuminated, two-dimensional graphics image can be recorded on the photographic media by controlling the movement of the lens in two dimensions. A method is also provided for providing a continuously variable transmission of light through a liquid crystal shutter to control exposure of the photographic media.

29 Claims, 13 Drawing Sheets

X,Y-MOTOR AND CHARACTER WHEEL MOVEMENT

CLOCK INTERRUPT FUNCTION ROUTINE

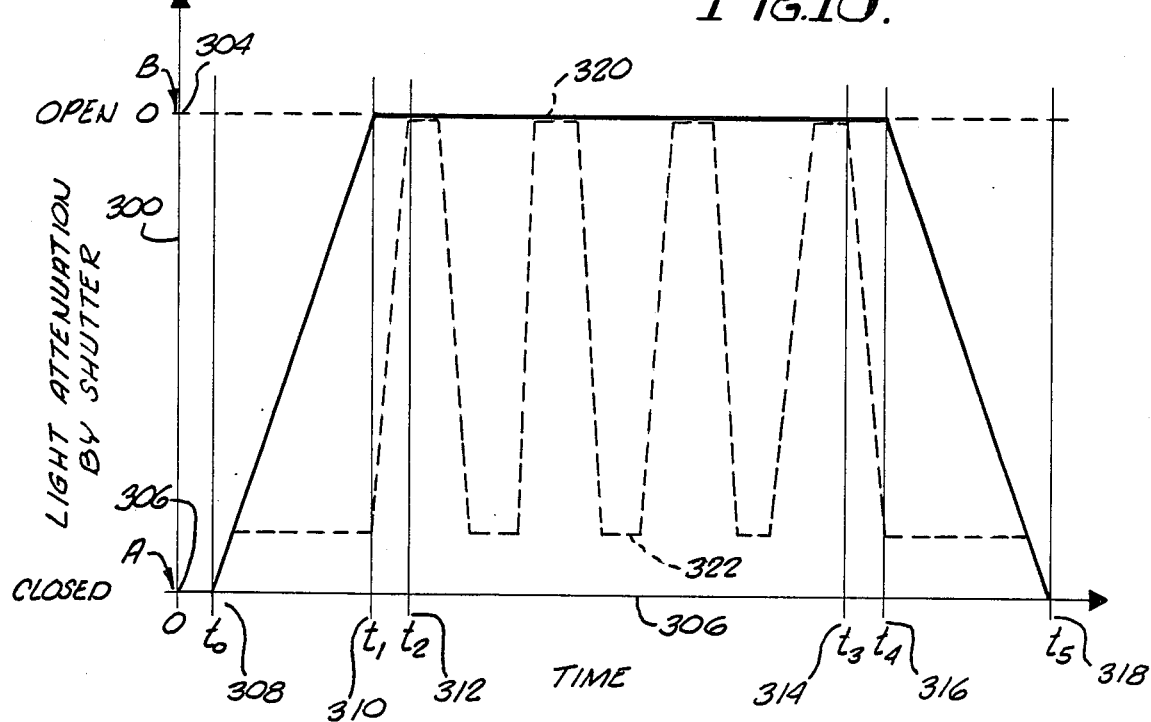
fig. 10.
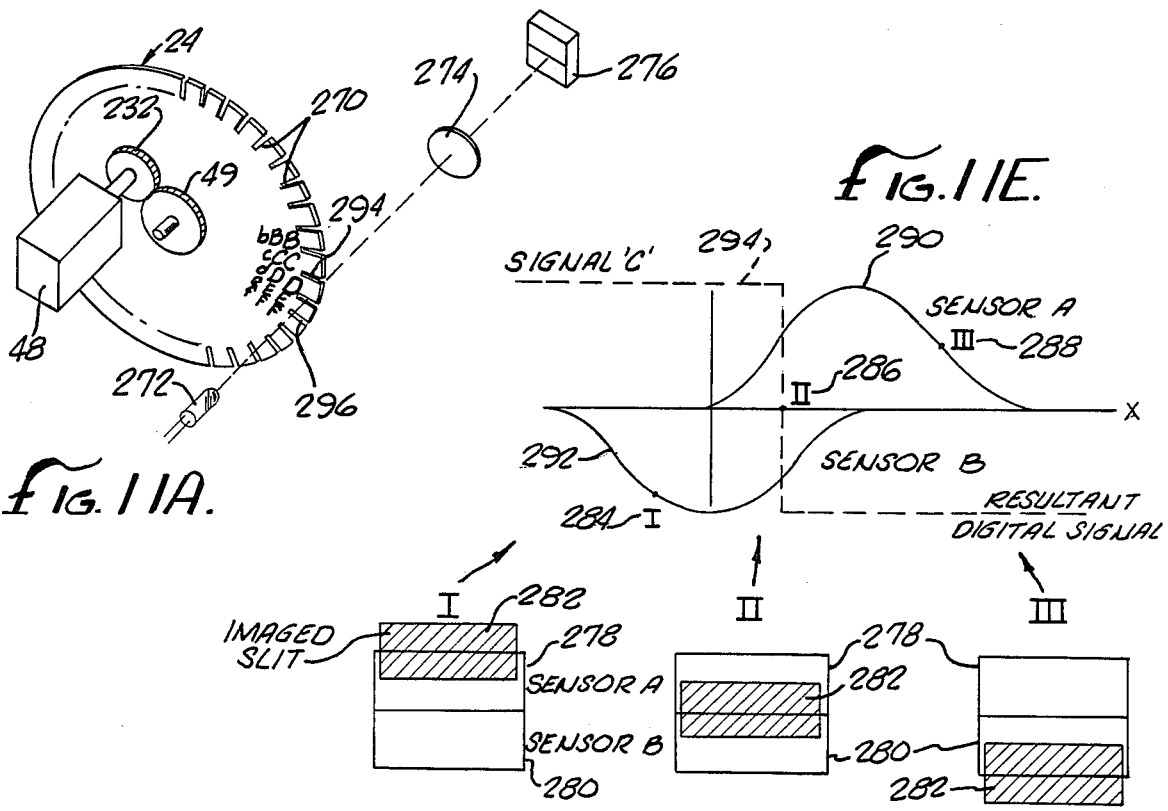
fig. 11A.   fig. 11E.
fig. 11B.   fig. 11C.   fig. 11D.

FIG. 12-1 $\quad \dfrac{m_2}{m_1} = \dfrac{\Delta Y}{\Delta X}$

FIG. 12-2 $\quad m_1 = \dfrac{10^6}{n_x T_x} \, [\text{in./sec.}]$

FIG. 12-3 $\quad m_2 = \dfrac{10^6}{n_y T_y} \, [\text{in./sec.}]$

FIG. 12-4 $\quad S = \sqrt{m_1^2 + m_2^2}$

FIG. 12-5 $\quad n_x = \dfrac{10^6}{T_x} \cdot \dfrac{\sqrt{\Delta X^2 + \Delta Y^2}}{S \Delta X}$ FIG. 12-6 $\quad n_y = \dfrac{10^6}{T_y} \cdot \dfrac{\sqrt{\Delta X^2 + \Delta Y^2}}{S \Delta Y}$ FIG. 12-7A $\quad \dot{X} = -Y \, ; \, \dot{Y} = X$ FIG. 12-7B $\quad \dot{X} = -\dfrac{S}{R} Y \, ; \, \dot{Y} = \dfrac{S}{R} X$ FIG. 12-8
$\dot{X}(t) = -\dfrac{S}{R} y(t) \, ; \, \dot{Y}(t) = \dfrac{S}{R} X(t)$
$X(t + \Delta t) = \dot{X}(t) \Delta t + X(t)$
$Y(t + \Delta t) = \dot{Y}(t) \Delta t + Y(t)$ FIG. 12-9
$X(0) = X_0$
$Y(0) = Y_0 \text{ such that } X_0^2 + Y_0^2 = R^2$ FIG. 12-10
$n_x = \dfrac{10^6}{\dot{X} k} \, [\mu\text{sec}/\mu\text{step}]$
$n_y = \dfrac{10^6}{\dot{Y} k} \, [\mu\text{sec}/\mu\text{step}]$ FIG. 12-11
The period of each step for the x motor = $n_x(t)$
The period of each step for the y motor = $n_y(t)$

APPARATUS FOR GENERATING COLOR TEXT AND GRAPHICS ON PHOTOGRAPHIC MEDIA

This is a continuation of application Ser. No. 785,466 filed on Oct. 8, 1985, now abandoned.

BACKGROUND OF THE INVENTION

1. Field of the Invention

The present invention relates to preparation of photographic media, such as slides and foils, as are used for business meetings and other purposes. More particularly, the present invention relates to an apparatus for preparing color slides and other photographic media containing textual material and x-y addressable graphics for a variety of uses.

2. Background of the Invention

Photographic reproduction of alpha-numeric characters is known and currently in use, particularly in the fields of phototypesetting and microfilm technology. As used herein the term "alpha-numeric characters" includes logos and icons. Systems are known which transfer images of alpha-numeric characters from a cathode ray tube (hereinafter "CRT") to photographic media. Such systems are primarily used in the field of phototypesetting. These systems can be broken down into two categories: those with less than 1200 lines of resolution across a slide (low-medium resolution) and those with 2000 or more lines of resolution across a slide (high resolution). Typically, film resolution is limited at about 4000 lines of resolution across a 35 mm slide. One major drawback of low-medium resolution systems is that the resolution of the images produced on the film is limited by the raster scan resolution capability of the CRT used to generate the character image. Such systems perform adequately the task of conveying information, but they cannot meet the demand for high resolution text and graphics usable for creating high quality slides and photographic media suitable for presentations at business meetings and other similar applications.

Other problems inherent in low resolution, low cost systems which make use of CRT's in generating images to be projected onto photographic media include distortion, soft focus, exposure variations at edges and color impurity. Distortion of images is caused by the fact that the CRT is not flat but is curved and thus images generated on a CRT are likewise slightly curved making the generation of straight lines in all areas of the CRT next to impossible. Soft focus can occur in portions of CRT generated images because the spot size of the electron beam is larger at the edges than in the center of the CRT. Exposure variations at edges occur because the intensity of the projected image from the CRT can vary significantly from center to edge because the distance from the electron gun to the corner of the CRT is greater than the distance from the electron gun to the center of the CRT. Color impurity is caused by the use of additive color systems employing three filters as are in effect used in CRT's. Such systems can induce color fringing and edge effects due to variations in image size over time with exposures from each of the three filters.

Systems for generating high quality graphics are known, but such systems are generally complex and expensive, and generate graphic images on CRT screens or on X-Y plotters using a moving stylus. For example, there are very high resolution CRT based devices available that are designed to image directly onto slide film. Typically 2000 to 4000 raster scan lines across the CRT are required in order to generate these high resolution images. CRT's with such high resolution are very expensive and systems employing them for the generation of high resolution images on film require a large amount of sophisticated and expensive electronics in order to translate the graphic information from the host computer to images on film. The inventors are unaware of non-CRT based apparatus which is capable of generating both high resolution alpha-numeric characters and graphics for printing on colored photographic media such as 35 mm slides, or larger transparent foils.

The use of high-resolution optical transparencies containing type font shapes is known for applications such as phototypesetting. The use of high-resolution optical transparencies as the source for alpha-numeric images eliminates the need for a high-resolution CRT and for the electronic control circuitry necessary in order to make use of such a high-resolution CRT. A high-resolution optical transparency is stored on a photographic or other similar media. By projecting a light from the back of the high-resolution optical transparency, a high-resolution image of the desired character, icon, logo or other image can be readily obtained, focused, and projected onto the photographic media.

SUMMARY OF THE INVENTION

In a first aspect of the present invention, a system is disclosed for composing, generating and printing high resolution alpha-numeric characters and graphics. Textual material and information representative of graphics shapes are entered into a data processing device, such as a personal computer to which this invention is attached. A moveable disk or drum media contains transparencies of one or more type-font sets of alpha-numeric characters, symbols, logos, etc. at different radial or axial positions. The media is positioned by signals from the data processor so that the desired character is aligned with a light source, an aperture, a shutter, a lens moveable in the X-Y plane, and, optionally, a moveable disk or drum containing optical filter material (hereinafter "filter wheel" or "color filter wheel") for defining the color of the image exposed. In response to signals from the data processor, the lens positions an image of the selected character on a selected location of a photographic media such as standard 35 mm slide film. The character image is exposed and other characters may be similarly selected, positioned and exposed. A color may be selected by positioning the color filter wheel in the light path.

Different graphics images may be created by selectively moving the X-Y moveable lens during the exposure of, for example, the period or other selected graphic elements which may be included on the disk or drum for that purpose.

In this manner, the direct plotting of x-y addressable graphics onto photographic media with light is accomplished.

In a second aspect of the present invention, a method useful for controlling a liquid crystal shutter is disclosed. A liquid crystal plate is utilized as a shutter to attenuate light transmission from a light source to a photographic media. This system is utilized in addition to an opaque capping blade because even in the minimum transmission orientation, the liquid crystal plate is not perfectly opaque. The amount of light passing through the liquid crystal shutter is controlled and modulated by a microprocessor. The amount is a function of the combination of film type and filter color.

Accordingly, it is an object of the present invention to provide an apparatus that is capable of generating photographic media having both high-resolution graphics and high-resolution textual material in a variety of foreground and background colors.

Another object of the invention is to provide a continuously variable transmission of light through a liquid crystal shutter.

Other and further objects and advantages will appear hereinafter.

BRIEF DESCRIPTION OF THE DRAWINGS

FIG. 10 is a timing diagram for the operation of the mechanical and liquid crystal shutters.

FIGS. 11A-11E are a series of diagrams detailing the operation of the character wheel alignment sensor system.

FIG. 12 contains equations used to control the drawing of arcs, lines and circles.

DETAILED DESCRIPTION OF THE PREFERRED EMBODIMENT

Figure 1:
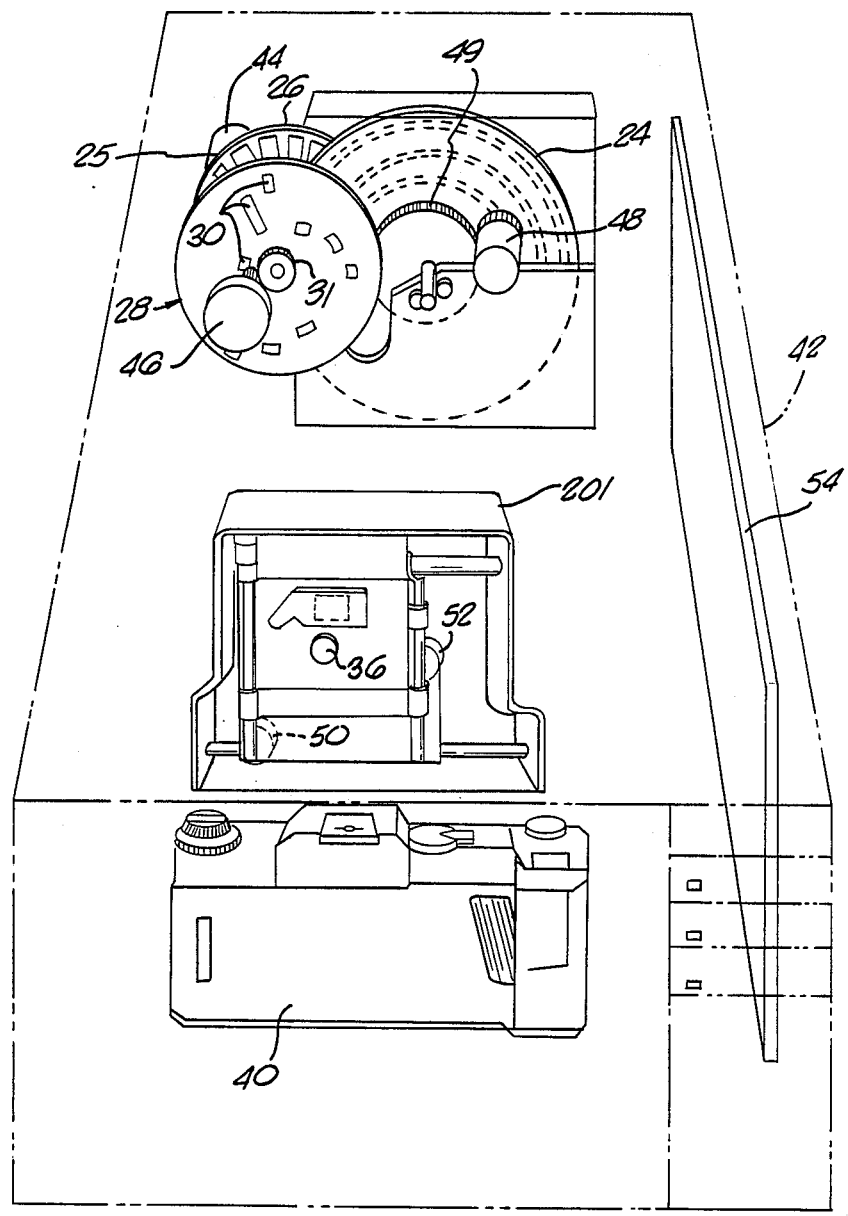
FIG. 1 is a perspective view of the hardware portion of the preferred embodiment of the present invention showing the relationships between its components.
Figure 2:
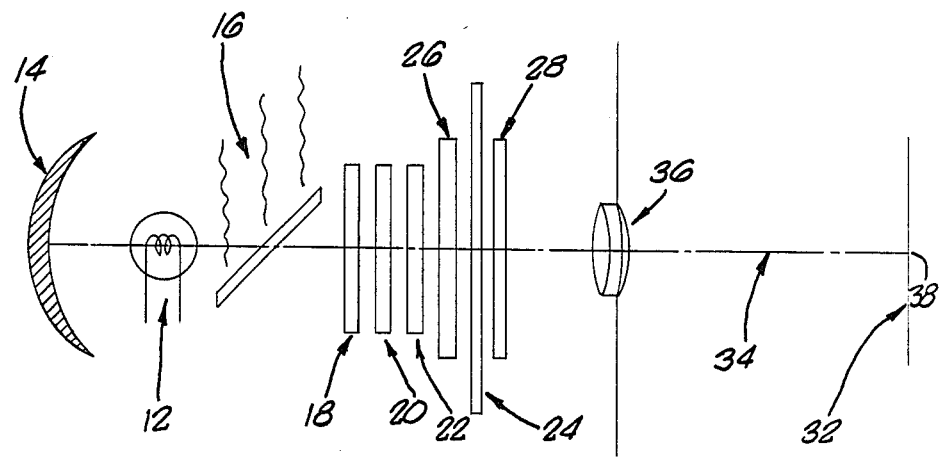
FIG. 2 is a schematic diagram of a cross-section of the apparatus.
Figure 4B:
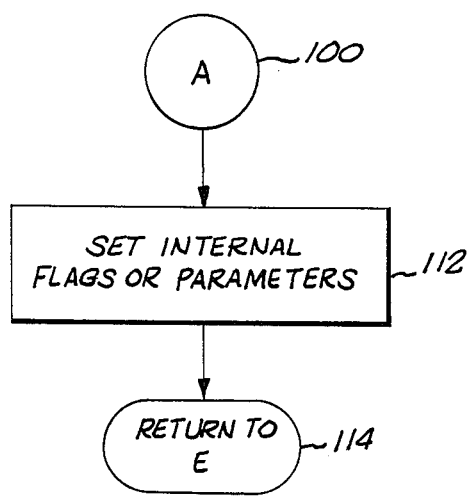
FIGS. 4A-4E are flow chart diagrams detailing the operation of the software that controls the apparatus.

The apparatus has been designed to be compact and lightweight for use on a desk and easy transportability. Turning in detail to FIG. 1 (a perspective view of the hardware portion of a preferred embodiment showing the relationship between its components), and FIG. 2 (a schematic diagram of a cross-section of the apparatus), it is seen that the apparatus includes a light source which may be a tungsten-halogen light source 12, a light reflector 14, a heat reflector 16, a heat absorber 18, a liquid crystal shutter 20, a light diffuser 22, a removable and interchangeable alpha-numeric character wheel 24, a color filter wheel 26 having filters 27 and an aperture wheel 28 having apertures 30, therethrough appropriate to allow light to pass therethrough to expose the photographic media located at the film plane 32. The aforementioned light source 12, light reflector 14, heat reflector 16, heat absorber 18, liquid crystal shutter 20, light diffuser 22, character wheel 24, color filter wheel 26 and aperture wheel 28 may be aligned co-axially or on substantially parallel axes with overlap along the axis of the light path 34. Light passes from light source 12 and off of light reflector 16 along light path 34 through heat reflector 16 where heat is reflected off of light path 34, through heat absorber 18 where additional heat is absorbed and then through liquid crystal shutter 20, light diffuser 22 where the light is diffused, color filter wheel 26, character wheel 24, aperture wheel 28, and into lens 36, moveable in two directions which are substantially perpendicular to the light path. The light passes through the lens 36 and is focused by the lens 36 onto a focus area 38 where the image is to be recorded on a photographic media 32 which is contained in a camera 40. In a preferred embodiment, a commerically available 35 mm camera back having fully automatic winding and film transport mechanism may be employed although those skilled in the art will readily appreciate that other cameras could be employed. The entire apparatus is housed in a light tight chassis 42 to prevent spurious light from exposing the photographic media. Stepping motors 44, 46, and 48 are utilized to position respectively the color filter wheel 36, the aperture wheel 28, and the character wheel 24. Stepping motors 60 and 52 under micro-stepping control are utilized to position the lens 36 in two dimensions referred to herein as the X (left-right) and Y (up-down) dimensions. Electronic Circuitry for powering and controlling the apparatus is contained on a circuit board 54.

The stage housing 201 contains the lens 36 which is used to position the image on the photographic media 32. The lens 36 is moveable in two substantially perpendicular directions, referred to herein as x and y, which are themselves substantially perpendicular to the light path 34. The lens 36 used in a preferred embodiment may have a focal length of 50 millimeters and a focal ratio of f8, and has its center positioned 75 millimeters from the plane containing photographic media 32 and 150 millimeters from character wheel 24, although those skilled in the art will readily appreciate that other configurations of focal length and focal ratio may be used depending upon the size of character wheel 24 employed and dimensions of the apparatus.

Figure 7:
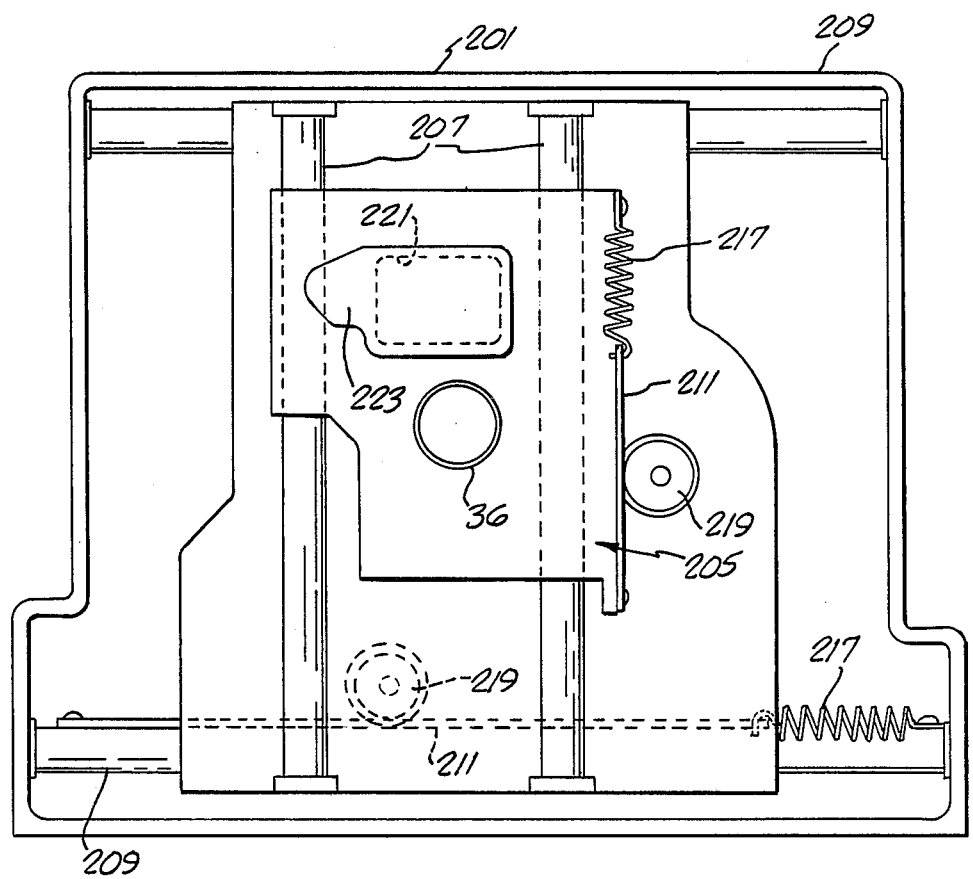
FIG. 7 is a side elevation of the x-y lens stage mechanism.
Figure 8A:
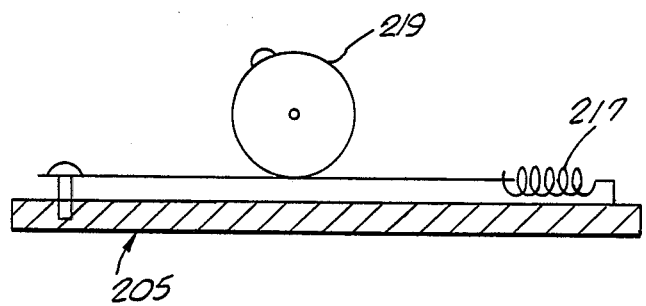
FIGS. 8A-8D are a series of diagrams detailing the operation of the drive band mechanism.
Figure 8B:
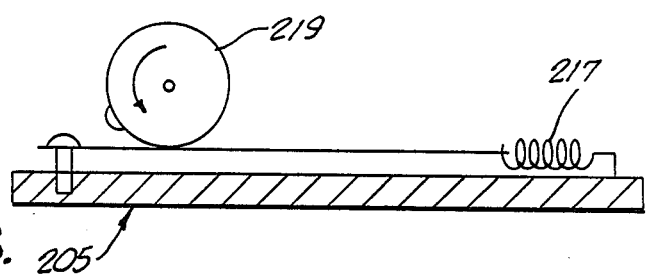
Figure 8C:
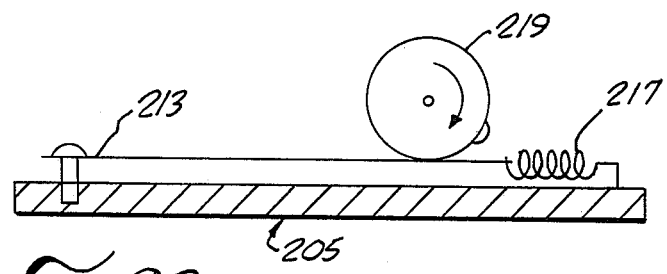
Figure 8D:
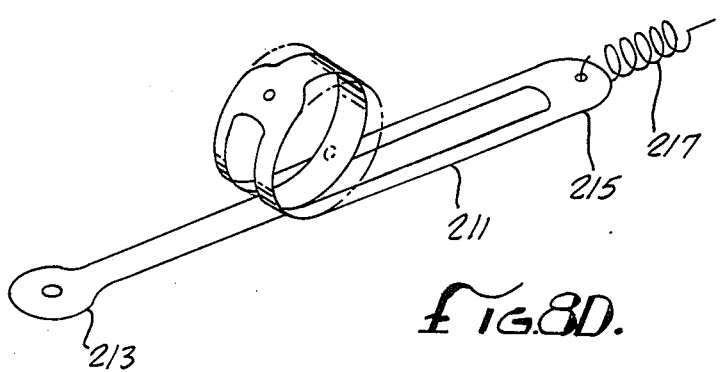

Turning now to FIG. 7, stepping motor 52 (FIG. 1) under microprocessor control controls the y (up-down) position of the stage 205 containing the lens 36. Stepping motor 50 controls the x (left-right) position. The stage moves up and down on and is kept in registration by tracks 207, the stage moves left and right on and is kept in registration by tracks 209. Movement is transferred from the motors 50 and 52 to the moveable stage 205 by band drive mechanisms detailed in FIG. 8. A relatively thin band 211 which may be made of metal is rigidly fixed to the stage at end 213 and is spring mounted to the stage at another end 215 with spring 217. The band wraps around a wheel 219 and counterclockwise drive motion of the wheel as in FIG. 8-2 causes the stage to move to the right as defined in FIG. 8-2. Similarly, clockwise drive cause stage motion to the left (FIG. 8-3). The wheels 219 are engaged by the stepping motors 50 and 52 to effect x-y position control of the stage. When the stage 205 is driven all of the way to its lowest position, the lens 36 is no longer in the light path and the large aperture 221 may now allow light to pass through to expose the entire photographic frame, as is desirable when exposing a background color. An auxillary shutter 223 covers the aperture in normal use and snaps out of the way when the stage is positioned at its lowest point.

In order to expose a background color on photographic media 32 large aperture 221 is opened and auxiliary shutter 223 is snapped out of the way. Color filter wheel 26 is positioned so that one of the color filters 27 is positioned in the light path. The photographic media 32 is exposed and may be additionally exposed with other color filters in order to additively form a background color not found on color filter wheel 26.

The lens control motors are micro-stepped in order to achieve higher resolution images with improved positional accuracy.

Figure 5:
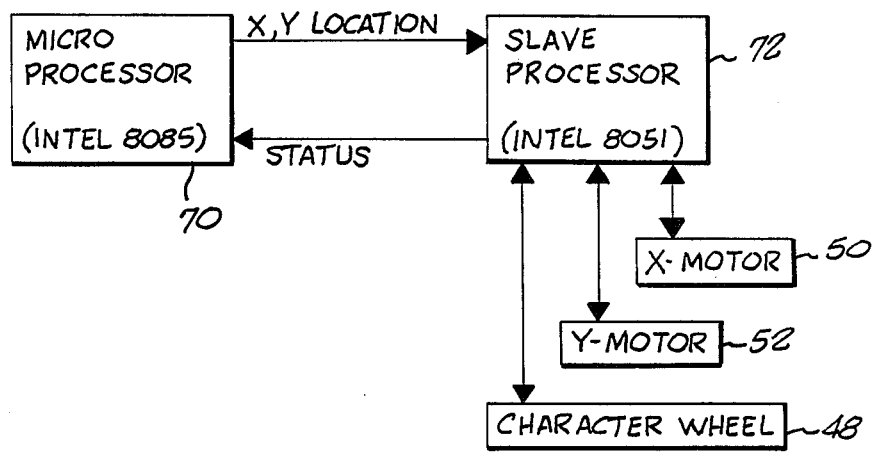
FIG. 5 is a flow chart showing the orientation of the microprocessor control links which control x and y motor and character wheel movement.

Microstepping of the motors is achieved by dividing full steps of the stepping motors into 32 substeps or microsteps as is well known in the prior art and described in the article "Micro-stepping of Step Motors," Superior Electric Company, Connecticut, 1978 which is hereby incorporated herein by reference. Actual control of the microstepping is handled by microprocessors used in a conventional manner. In an actual embodiment of the invention, as shown in FIG. 5, an Intel Model 8085 Microprocessor 70 controls most functions of the apparatus and a slave processor 72, Intel Model 8051 controls the actual movement, including microstepping, of the x-motor 50, the y-motor 52, and the character wheel positioning motor 48. The x and y location that is desired is relayed to slave processor by the microprocessor and status information is relayed back to the microprocessor by the slave processor indicating final motor position information and the like.

As detailed in FIG. 11-A, digital feedback via a split cell sensor 276 and microstepping are used to position the character wheel 24 more accurately than would be possible with a simple open-loop stepping motor. Servo marks 270 are placed on the outer perimeter of character wheel 24. Infrared light emitting diode 272 is located on one side of character wheel 24 and positioned to project infrared light through servo marks 270. A lens 274 is located on the side of character wheel 24 opposite infrared light emitting diode 272 and is positioned to focus light from diode 272 upon a split cell sensor 276. As character wheel 24 is rotated past the sensor, outputs as detailed in FIGS. 11-B, 11-C and 11-D are generated causing corresponding electronic signals as depicted in FIG. 11-E. In case I as depicted in FIG. 11-B, all of the image 282 of servo mark 270 is projected onto sensor A 278 of split cell sensor 276 causing the output signals in FIG. 11-E in the area designed I 284. In this case, character wheel 24 is out of alignment. In case II as depicted in FIG. 11-C, the image 282 of servo mark 270 is projected equally onto sensor A 278 and sensor B 280 of split cell sensor 276 causing the output signals in FIG. 11-E in the area designated II 286. In this case, character wheel 24 is in alignment and exposure may proceed. In case III as depicted in FIG. 11-D, all of image 282 of servo mark 270 is projected onto sensor B 280 of split cell sensor 276 causing the output signals in FIG. 11-E in the area designated III 288. In this case, character wheel 24 is out of alignment. Each sensor half, sensor A 278 and sensor B 280 produces an analog output (290 and 292 respectively) proportional to the amount of imaged servo mark 282 incident on it. The two offset signals 290 and 292 are combined electronically to produce a digital signal 'C' 294 which is fed back to the controlling microprocessor as an indication of character wheel 24 alignment status. The character wheel 24 is correctly aligned when the digital signal 294 changes state 286. Thus typically, in order for character wheel 24 to be moved from one character, e.g. 294 to another character, e.g. 296, the motor 48 will be stepped the number of whole steps to get from the first character 294 to the second character 296, then, because of anticipated positioning error inthe system, the stepping motor is placed under microstepping control and split cell sensor 276 is analyzed by the microprocessor. The microprocessor analyzes the signals from split cell sensor 276 to determine in which direction to microstep the character wheel positioning motor 48. When the digital signal 'C' 294 changes state, the character wheel 24 is aligned to within plus or minus one half microstep and the exposure may proceed. The size of the microstep is chosen based upon the desired tolerances of the system.

Repeatability errors are positional errors involving the inability of an object under the control of stepper motors to return to exactly the same X-Y position repeatedly.

In order to minimize repeatability errors, the stepping motors that control the position of the lens on the x-y stage are controlled in a unique way. For each line of text, the characters to be exposed on that line are exposed upon the photographic media in an order that causes the X motor 50, i.e., the motor that controls the left-right position of the lens 36, to move exclusively and incrementally in one particular direction. In this way, the motor is never required to return to a prior position and the possibility of registration errors due to an inability to return to the same exact position is thus eliminated.

Software described below causes the lines of text to be sorted so that characters are printed in the order that allows the X motor 50 to be driven continuously in one direction. This sorting is required because the character wheel 24 has characters at different radii and thus it is the case that certain textual material if exposed context-sequentially on the photographic media 32 would require the X motor 50 to backtrack frequently in order to correctly position all of the characters on the photographic media 32.

Figure 3A:
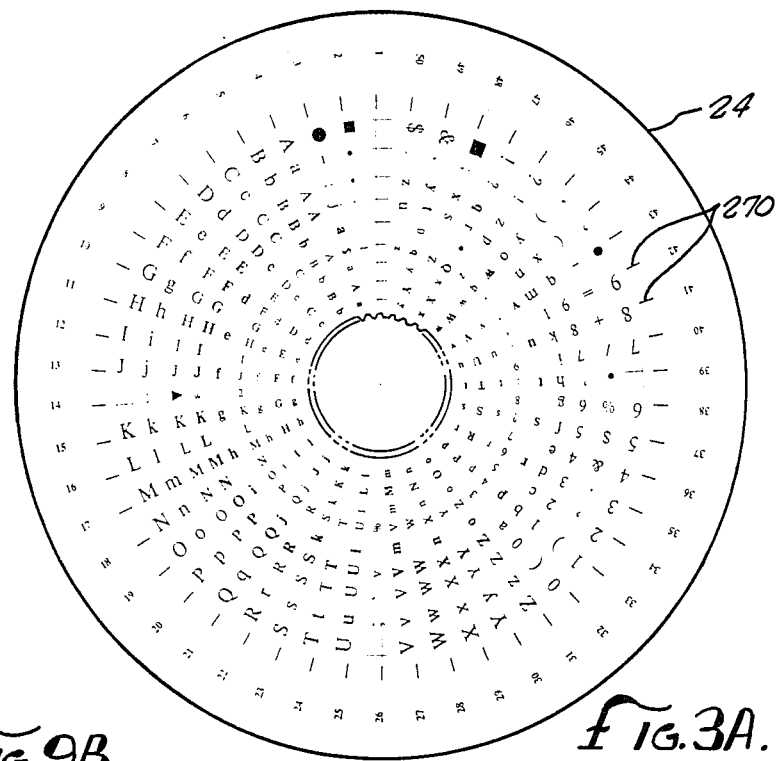
FIG. 3A shows a character disk suitable for use with the present invention.
Figure 9B:
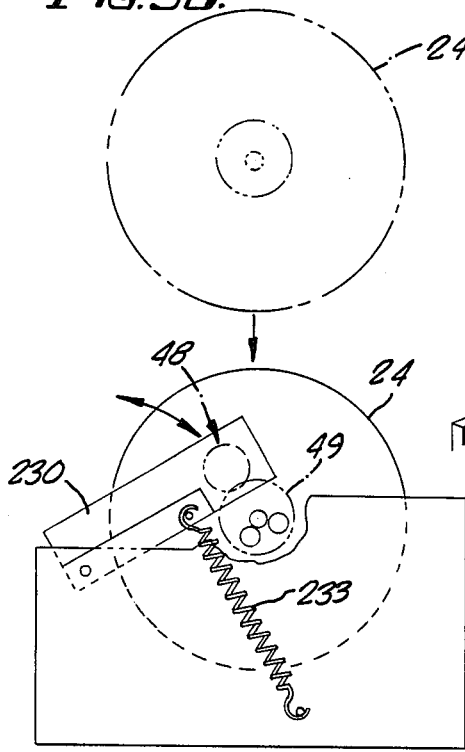
FIG. 9B is a side elevation showing how the character disk seats in the retention mechanism.
Figure 9A:
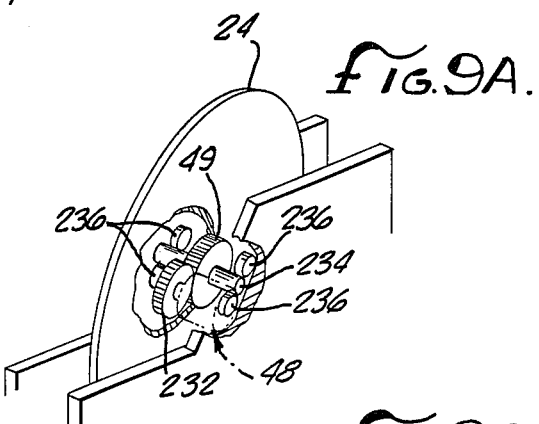
FIG. 9A is a perspective view showing the character disk positioned in the retention mechanism.
Figure 9C:
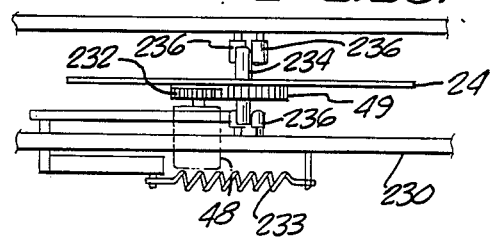
FIG. 9C is a top plan view showing the character disk positioned in the retention mechanism.

FIG. 3A shows a positive of the character position layout for a typical alpha-numeric character wheel 24 as used in a preferred embodiment. The character wheel 24 serves the function of generating images. In an actual embodiment, the character wheel images are stored in photographic positive format. Character wheels 24 are interchangeable and each different character wheel 24 may require different exposure and positioning information to be available to the apparatus. In order to enable the apparatus to properly locate and expose characters from different character wheels 24, the information includes such things as style, size, height, and width for all character wheels 24 may be stored in memory within the apparatus or it may be downloaded as needed from a host computer system to the apparatus with each change of character wheel 24. This information includes such things as spacing, kerning, number of characters per line and so forth. Kerning is a well-known method of achieving enhanced proportional spacing which take into account, among other things, the relationship shapes of adjacent characters. Positioning of the character wheel 24 is accomplished by stepping motor 48 which engages a gear 49 located about the axis of the character wheel 24. As shown in FIGS. 9A, 9B and 9C, the character wheel 24 is removable and seats into a retaining mechanism. A member 230 to which is attached the stepping motor 48 is biased by spring 233 so that when the character wheel 24 is inserted into position, the member 230 snaps down on it and causes the teeth of a gear 232 attached to the stepping motor 48 to engage the teeth of gear 49 providing drive to the character wheel 24. The character wheel 24 has an axle 234 which rides on crowned bushings 236 to provide accurate support of the character wheel 24.

Figure 3B:
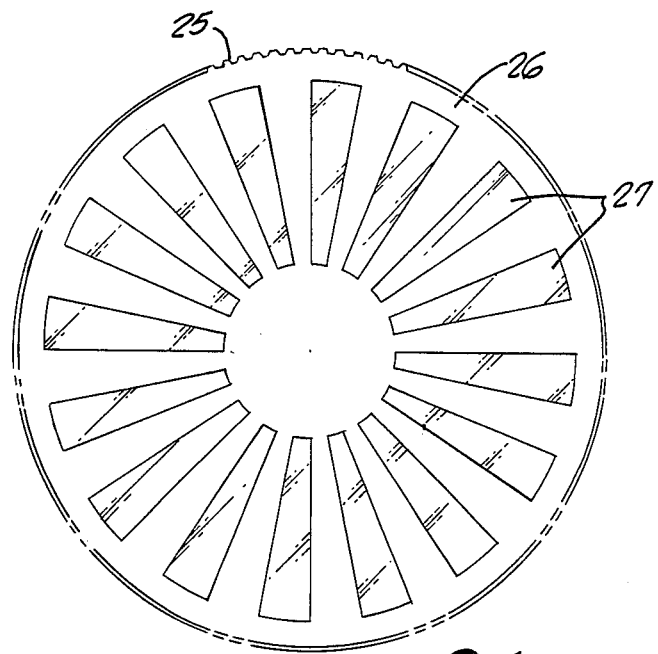
FIG. 3B shows a filter wheel suitable for use with the present invention.

The color filter wheel 26 shown in FIG. 3B is a disk having a number of optical colored filters associated 27 with it. In an actual embodiment, provision is made for as many as 16 different color filters. Upon command, a colored filter 27 may be rotated into the light path in order to provide a color to theimage to be exposed. Provision is made to optionally expose one or more background colors initially and then to individually determine the color of the characters or images being exposed. Once a background color has been exposed, character or image colors are then determined by placing the appropriate colored filter 27 in the path of the light that individual characters or images are exposed with. Exposure times and the degree of transmission of the Liquid Crystal Shutter 20 are determined by a microprocessor. In addition to the several color filters 27 provided, provision is made for virtually any color to be exposed on the photographic media 32 by appropriately exposing an image with each of the red, green and blue filters provided for this purpose as is well known in the art. Information relating to the color filter wheel 26 and the particular color combination are also stored in firmware within the apparatus. Positioning of the color filter wheel 26 is accomplished by stepping motor 44 which engages a gear 25 located about the axis of the aperture wheel 28.

Figures 3C, 3D:
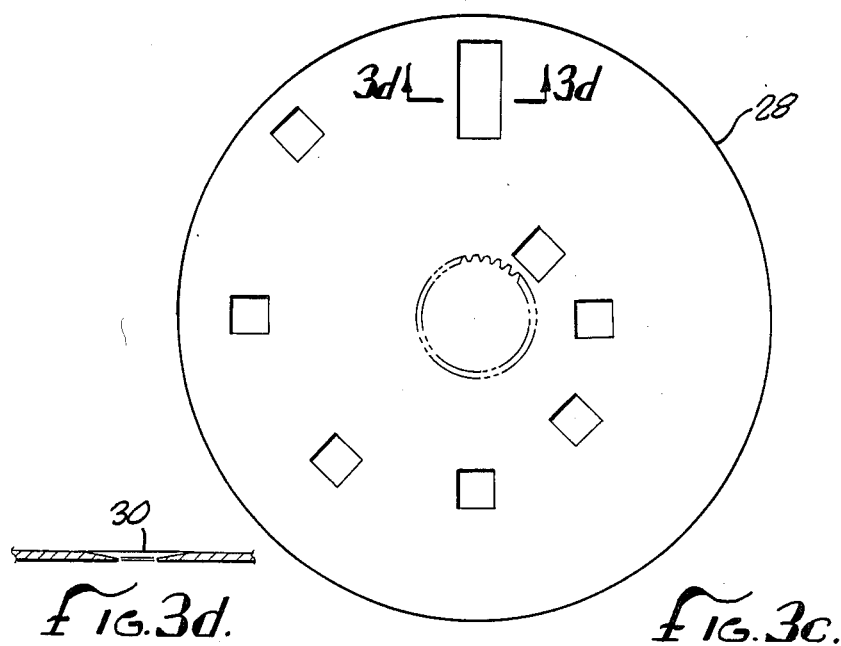
FIG. 3C shows an aperture disk suitable for use with the present invention.
FIG. 3D is a cross-sectional view of one of the apertures depicted in FIG. 3C taken along lines 3D—3D of FIG. 3C.
Figure 4A:
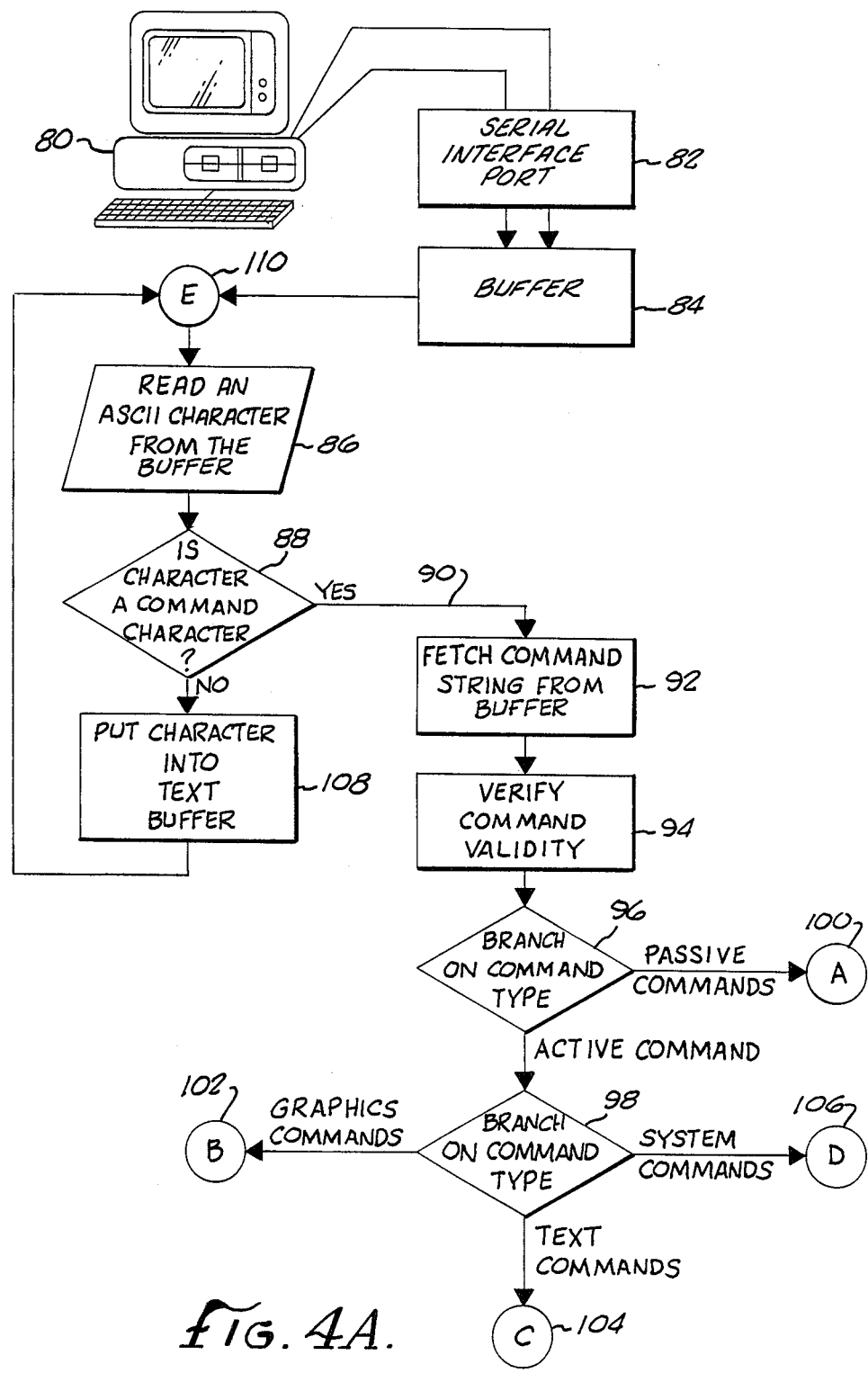
Figure 4C:
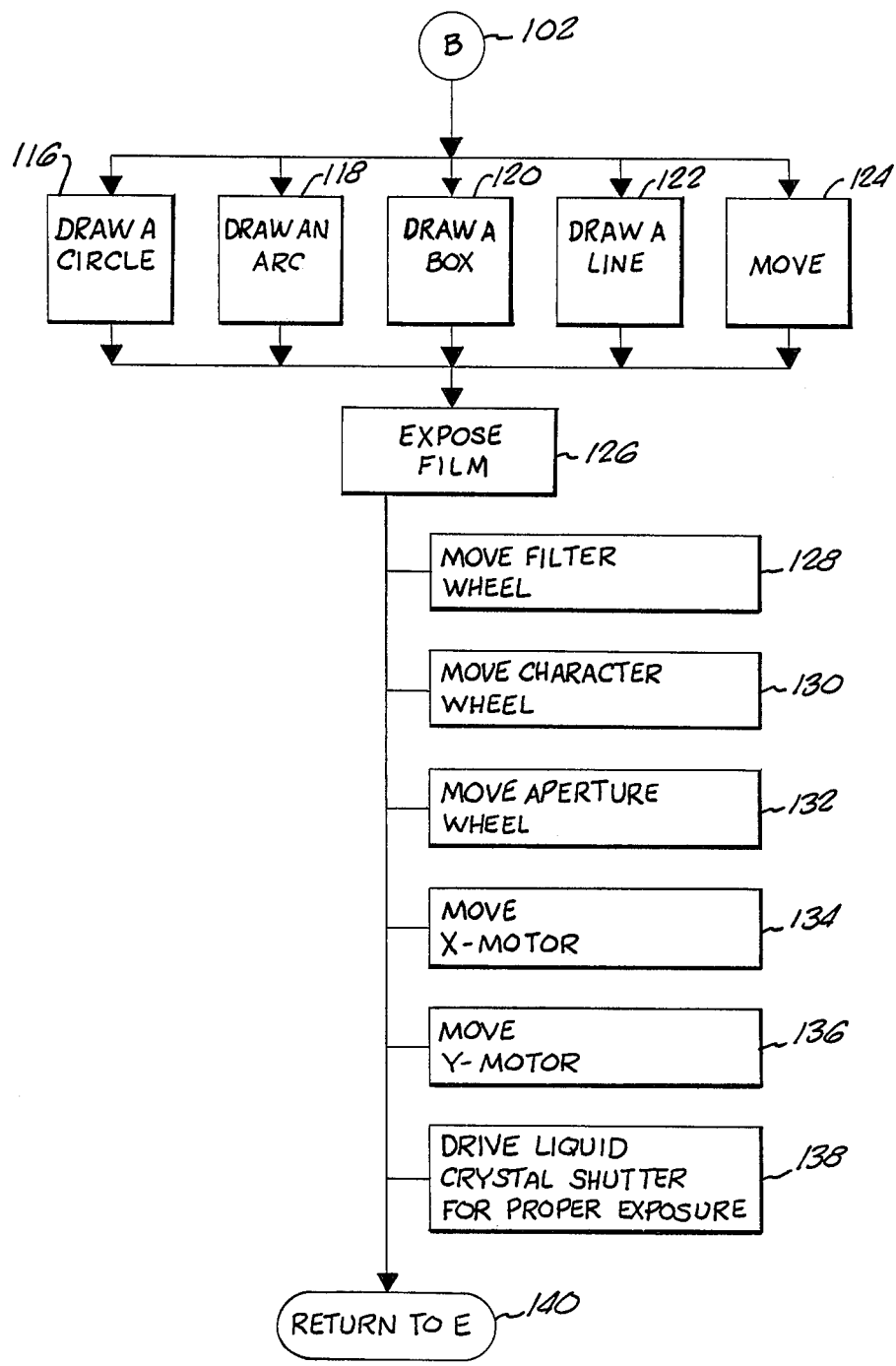
Figure 4D:
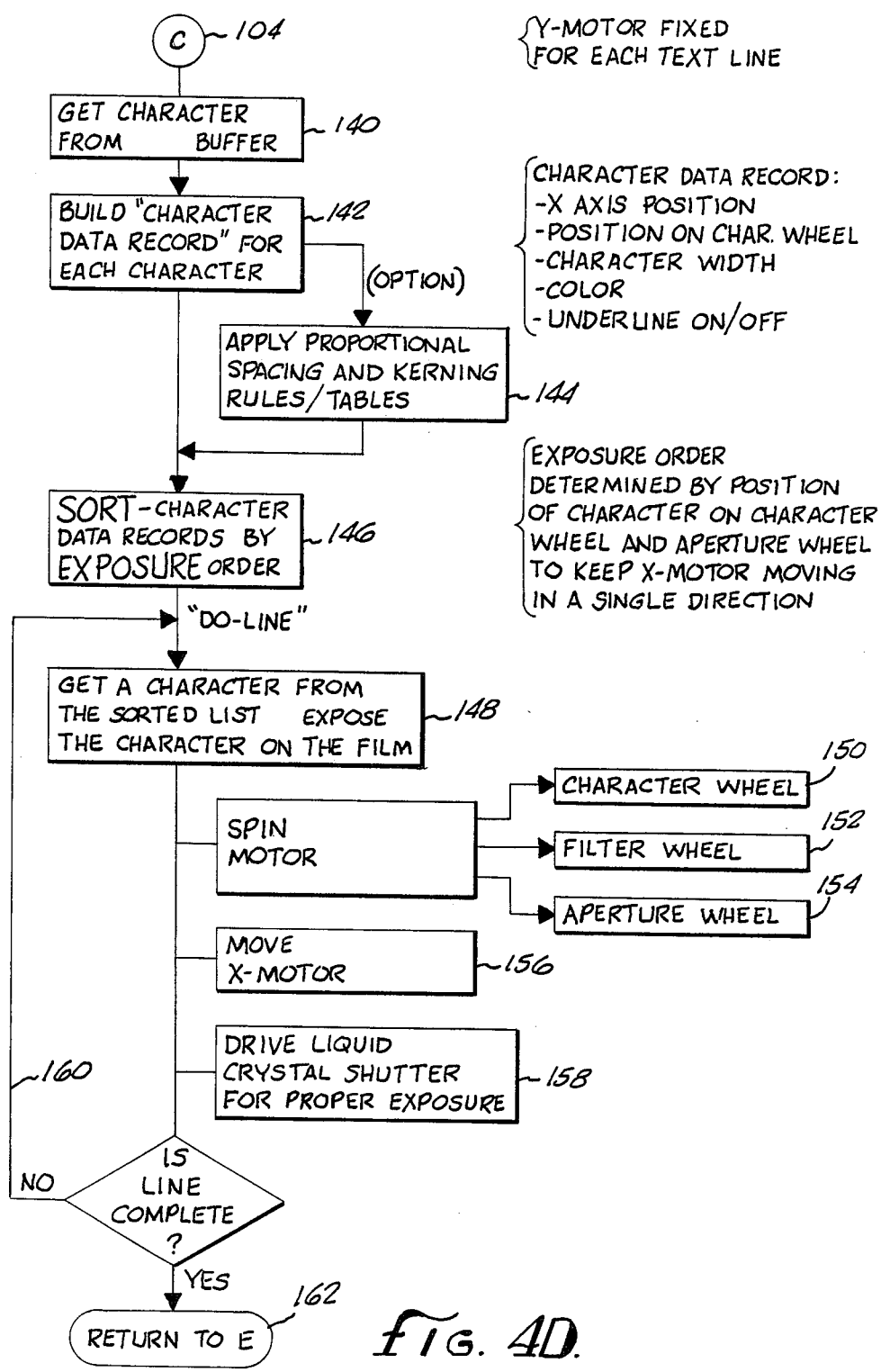
Figure 4E:
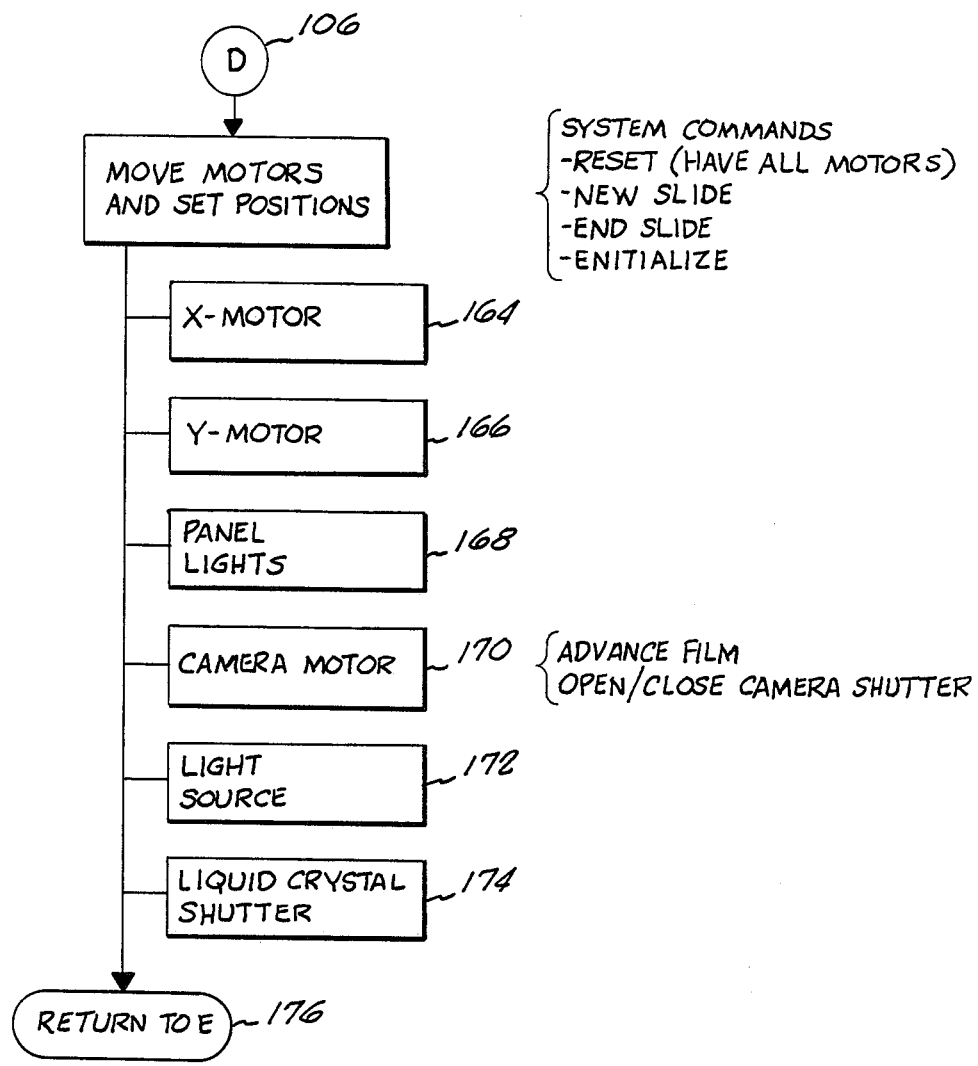

Referring now to FIG. 3C, the aperture wheel 28 has at least one aperture 30. The aperture wheel 28 is used to select a character track of character wheel 24 and as a capping blade and works in conjunction with the liquid crystal shutter 20 to control the exposure of the film. As can be seen in FIG. 3D, the width of the aperture wheel 28 narrows in the vicinity of the aperture 30. Positioning of the aperture wheel 28 is accomplished by stepping motor 46 which engages a gear 31 located about the axis of the aperture wheel 28. In the preferred embodiment, the aperture wheel 28 contains a number of apertures 30 which are conveniently located on the aperture wheel 28 so as to provide an aperture 30 for each track of characters on the character wheel 24 and several positions where the aperture wheel 28 is closed so that it can be closed quickly regardless of the character/aperture configuration chosen.

Referring now to FIG. 4-A, the apparatus is controlled with a microprocessor, such as an Intel Corporation Model 8085 Microprocessor. A host computer 20, such as an IBM Personal Computer is connected to the apparatus via a standard RS-232-C-type Asynchronous Serial Port 82. A parallel Interface Port or other type of Interface may also be utilized to connect the apparatus to the host computer. The microprocessor then causes characters to be read from the interface port into a buffer 84 which is a storage device located within the apparatus. The buffer 84 stores characters for use later by the apparatus.

Software step 86 executed on the microprocessor then causes a character to be read from the buffer 84. A determination 88 is made as to whether the character constitutes part of a command string to the apparatus or not. If the character is part of a command string, the software branches as to a routine 92 which recovers the command from the buffer 84, verifies the validity of the command 94, and then branches 96, 98 to portions of the program designed to respond to the various valid commands 100-106. If the character read is not part of a command string, then the character is stored in a text buffer 108 for later printout on photographic media and control returned to location E 110 for the reading of another character.

Commands to the apparatus are of two primary types, active and passive. Passive commands cause control to pass to location A 100 for further processing. Active commands are parsed 98 into three groups, graphic commands with control transfer to location B 102, text commands with control transfer to location C 104, and system commands with control transfer to location D 106. Passive commands set internal flags, indicators or parameters such as color, size, underline-on, film type, drawing stylus selection, margins, pitch, font type and the like. Active commands have a physical result such as causing motors to be activated and the like.

On FIG. 4-B location A is depicted 100. Internal flags and parameters are set 112 according to the commands received. Control is then returned 114 to location E 110.

On FIG. 4-C location B is depicted 102. At this portion of the software, graphics commands are executed and include instructions for drawing circles 116, arcs 118, boxes 120, lines 122 and moving the lens without exposing the film 124.

The actual drawing of circles, arcs, lines and movement of the lens in straight lines can be broken into two problems which are both solved by the microprocessor. These are the drawing of lines, or movement in a line without drawing, and the drawing of circles, or movement over part of a circle to generate an arc. Equations are in FIG. 12 and wil be referred to 12-1, 12-2, etc.

First the case of lines will be considered:

$n(x)$ is defined as the x-motor pulse period in microseconds per microstep.

$n(y)$ is defined as the y-motor pulse period in microseconds per microstep.

$m(1)$ is defined as the x-motor speed over the photographic media in inches per second.

$m(2)$ is defined as the y-motor speed over the photographic media in inches per second.

s is defined as the speed of the light beam over the plane of the photographic media in half steps per second.

$r(x)$ is defined as the resolution of the x-motor in half steps per inch.

$r(y)$ is defined as the resolution of the y-motor in half steps per inch.

To draw a straight line as represented by the equation 12-1 where delta-x and delta-y define the difference of the endpoints of the line being drawn, $m(1)$ is solved for as in equation 12-2 and $m(2)$ is solved for as in equation 12-3. In order to obtain a constant, is solved for as in equation 12-4. Substituting, $n(x)$ and $n(y)$ are solved for as in equations 12-5 and 12-6 respectively. Thus knowing delta-x and delta-y and $n(x)$ and $n(y)$, the stepper motors can be commanded to move the lens in a straight line.

Now the case of circles and arcs (partial circles) will be considered:

R is defined as the circle radius in half steps.

x is defined as the x-motor position in half steps.

y is defined as the y-motor position in half steps.

x-dot is defined as the x-motor speed in half steps per second.

y-dot is defined as the y-motor speed in half steps per second.

A circle can be represented by the set of coupled, first order, differential equations shown in equation 12-7A or equivalently as in the equations shown in equation 12-7B. To draw a circle, the initial value problem presented in Equations 12-8 must be solved with the initial conditions as set forth at 12-9. Since n(x) and n(y) are as set forth in equations 12-10 where k is defined as the number of microsteps per half step, a circle can be drawn by commanding the x and y stepper motors to move, independently, one step at a time, with the period of each step for the x-motor and the y-motor as set forth in equations 12-11. Because the speed, s, is constant for the reasons stated above, time (t) is proportional to arc length. Thus, equations 12-8 can also be used to draw arcs. The advantages of drawing circles and arcs in this manner include: enhanced speed, because to calculate the period of each step requires only one division and some additional operations to be carried out by the microprocessor, and smooth circles may be achieved without the use of trigonometric functions such as sine and cosine. In accordance with drawing the above graphics images, film may be exposed 126, the filter wheel moved 128, the character wheel moved 130, the aperture wheel moved 132, the x-motor moved 134, the y-motor moved 136, and the liquid crystal shutter driven 138. Control is then returned 140 to location E 110.

On FIG. 4-D location C is depicted 104 at which point in the software, text commands are processed and text is caused to be output to the photographic media. First a character is obtained from the buffer 140, a character data record is established for each character in a line 142. Optionally, proportional spacing and kerning rules are applied 144 to enhance the visual appearance of the output. Kerning rules simply dictate the relative position of certain alphanumeric characters with respect to adjacent alpha-numeric characters for enhanced visual appearance and are well known in the art. Characters on a line of text are then sorted 146 so that they will be exposed in an order that allows the x-motor to be driven continuously in one direction. At this point the line of text is ready to be output to the photographic media. The y-motor is located at the position of the desired line of text. A character is obtained from the sorted list 148 and exposed upon the film. Position information is determined from the character data record. Exposure information may be determined from film speed, filters selected and character chosen. Exposure information is used by the liquid crystal shutter driver to determine the average transmissivity and length of exposure, the character wheel is positioned 150, the filter wheel is positioned 152, the x-motor is then positioned 156, the aperture wheel is positioned to an appropriate "open" position 154, and the exposure is made by driving the Liquid Crystal Shutter 158, then the aperture wheel is repositioned to an appropriate "closed" position". If the line is not complete 160, the process repeats until the line is complete. Then control returns 162 to location E 110.

FIG. 4-E illustrates the portion of the software at location D 106 that processes system commands. System commands include: Reset (return all lens position motors to their starting positions); initiate a new slide; end a completed slide; initialize; advance film; and open/close shutter. These commands are parsed at D and the appropriate control signals are generated to control the x-motor 164, the y-motor 166, panel indicator lights 168, camera motor 170, light source 172, and liquid crystal shutter 174. Control returns 176 to E 100 when the system command has been processed.

The shutter mechanism consists of two parts. The first part is a mechanical aperture wheel 28, also sometimes referred to herein as a mechanical shutter and a capping blade. Aperture wheel 28 contains apertures 30. The second part of the shutter mechanism is a liquid crystal shutter 20 (hereinafter sometimes referred to as LCS) which is capable of being driven by opening it (making it transparent) and closing it (making it relatively opaque). The LCS is capable of changing between transparent and opaque states much more quickly than can the capping blade 28, however, the capping blade 28 can achieve essentially complete attentuation of a light signal whereas the LCS 20 can only partially attenuate a light signal. Thus in order to achieve precise control of the amount of light travelling through the shutter mechanism, both the LCS 20 and the capping blade 28 may be used. The liquid crystal shutter 20 described herein is fabricated of two liquid crystal plates of length 1.5, width 0.4″ and thickness 0.150″. It is obtainable from the Tektronix Corporation under the designation PI-CELL. It will be readily apparent to those skilled in the art that other models and configurations may be used depending upon the characteristics of the photographic media to be utilized and the dimensions of the apparatus.

FIG. 10 details the timing operation of the shutter mechanism. Vertical axis 300 represents the quantity of relative attenuation of light passing through the shutter mechanism achieved by the shutter mechanism. The highest degree of attenuation is indicated at A 302 and the least at B 304. The horizontal axis 306 represents time in the conventional manner. At A 302, both the capping blade 28 and the LCS 20 are closed and no light is allowed to pass through the shutter mechanism. At t(o) 308 the mechanical shutter 28 starts to open. At t(1) 310 the mechanical shutter is fully open and the LCS 20 starts to open. At t(2) 312 the LCS 20 is fully open. At t(3) 314 the LCS 20 starts to close just prior to termination of exposure. At t(4) 316 the LCS 20 is closed and the capping blade 28 starts to close. At t(5) 318 the capping blade 28 is fully closed and the exposure is completely terminated. Between t(2) 312 and t(3) 314 the LCS 20 may be modulated between the open state 320 and the closed state 322 one or more times in order to precisely control the total amount of light passing through the shutter mechanism. It will be readily apparent to those skilled in the art that the number of times that the LCS 20 is modulated and the timing of the modulating will depend upon the dimensions of the apparatus, overall light attenuation in the apparatus and the characteristics of the photographic media in use.

Figure 6:
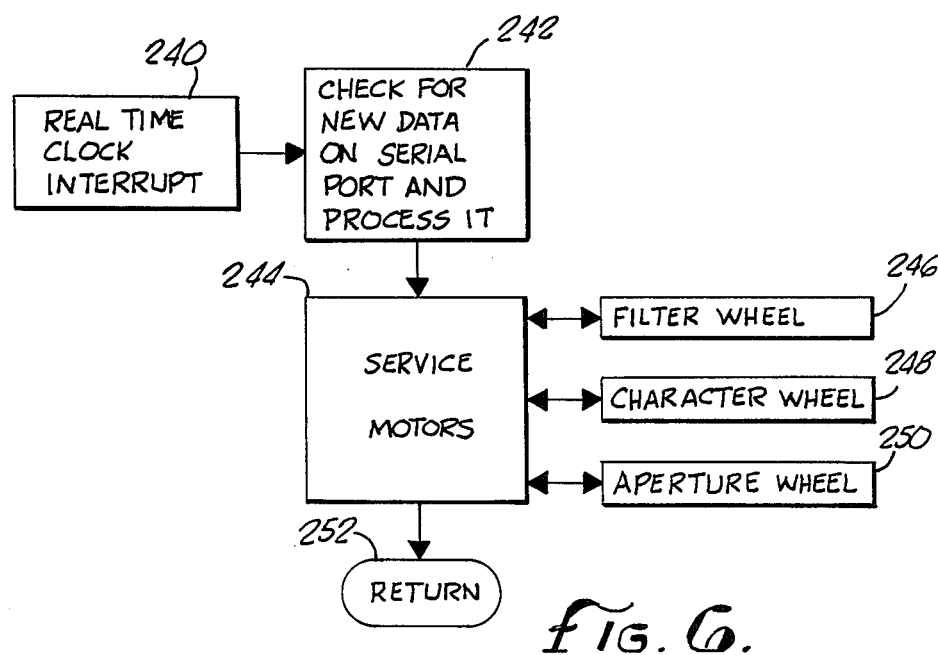
FIG. 6 is a flow chart showing the function of the Real Time Clock Interrupt Function Routine.

A real time clock interrupt function routine is provided in order to take advantage of microprocessor interrupts to continuously check for new commands or data and service the step motors. As shown in FIG. 6, on an interrupt 240, the buffer is checked for new data or commands 242 and then motors are serviced if required 244, this included the color filter wheel 246, the character wheel 248, and the aperture wheel 250. Control then returns 252 to the point in the software where the interrupts was encountered.

Thus an apparatus for generating color text and graphics on photographic media has been disclosed. A method is also disclosed which provides a continuously variable transmission of light through a liquid crystal shutter. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. Apparatus for generating photographic media containing images of alpha-numeric characters, said apparatus including:
   data entry means for entering information corresponding to identity and position of a plurality of selected ones of said alpha-numeric characters to be placed on said photographic media,
   storage means for storing said information,
   processing means for converting said information into output signals representing said identity and position,
   stationary photographic recording means for recording images of selected ones of said alpha-numeric characters on to said photographic media including means for holding said photographic media in position for light exposure, and shutter means for controlling the time of light exposure of said photographic media,
   a light source,
   moveable image generating media having transparent and opaque regions in predetermined areas, said regions forming silhouettes of at least one set of said alpha-numeric characters, said moveable image generating media being responsive to a first portion of said output signals to position a selected one of said silhouettes such that light from said light source passes through said selected one of said silhouettes to form a shaped light beam,
   a lens, interposed between said image generating media and said photographic recording means, surrounded by and mounted on an opaque stage moveable along two different linear axes in a plane parallel to the plane of said photographic recording media in response to a third portion of said output signals, said opaque stage having an aperture means mounted thereon, said aperture means being configured to open and thereby flood said photographic media with background light when said opaque stage is in a predetermined position,
   control means associated with said processing means for controlling said shutter means to produce on said selected area of said photographic media an exposed image of an alpha-numeric character from said shaped light beam.

2. The apparatus of claim 1 wherein said apparatus additionally includes means for generating photographic media containing graphic images.

3. The apparatus of claim 1 wherein said light source comprises a tungsten-halogen lamp.

4. The apparatus of claim 1 wherein said light source comprises a strobe lamp.

5. The apparatus of claim 1 wherein said shutter means comprises a liquid crystal shutter.

6. The apparatus of claim 5 wherein said shutter means additionally includes an aperture wheel interposed between said photographic media and said light source, said aperture wheel having appropriately sized apertures for exposing the alphanumeric characters on said image generating media.

7. The apparatus of claim 6 wherein said image generating media is removable.

8. Apparatus for generating photographic media containing graphics images and images of alpha-numeric characters, said apparatus including:
   data entry means for entering information corresponding to identity and position of a plurality of selected ones of said alpha-numeric characters and to the shape and position of graphics images to be placed on said photographic media,
   storage means for storing said information,
   processing means for converting said information into output signals,
   stationary photographic recording means for recording images of selected ones of said alpha-numeric characters and said graphics images onto said photographic media including means for holding said photographic media in position for light exposure, and shutter means for controlling the amount of light exposure of said photographic media,
   a light source,
   movable image generating media having transparent and opaque regions in predetermined areas, said regions forming silhouettes of at least one set of said alpha-numeric characters and graphics elements, said moveable image generating media being responsive to a first portion of said output signals to position a selected one of said silhouettes such that light from said light source passes through said selected one of said silhouettes to form a shaped light beam,
   a lens, interposed between said image generating media and said photographic recording means, surrounded by and mounted on an opaque stage moveable along two different linear axes in a plane parallel to the plane of said photographic recording media in response to a third portion of said output signals, said opaque stage having an aperture means mounted thereon, said aperture means being configured to open and thereby flood said photographic media with background light when said opaque stage is in a predetermined position,
   control means associated with said processing means for controlling said shutter means. and
   means for moving said stage in response to said output signals while light from said light source is exposing said photographic media.

9. The apparatus of claim 8 additionally including selectable color filter means, responsive to a fourth portion of said output signals, interposed between said light source and said photographic media for filtering said light source.

10. The apparatus of claim 9 additionally including aperture means, interposed between said light source and said photographic media, for controlling the exposure of said photographic media.

11. The apparatus of claim 8 wherein said image generating media includes a partially transparent high-resolution liquid crystal plate.

12. The apparatus of claim 8 wherein said shutter means additionally includes a capping blade means for completely attenuating said light beam.

13. The apparatus of claim 11 wherein said shutter means includes a liquid crystal shutter, said apparatus including modulating means for modulating said liquid crystal shutter between a high transmissive state and a low transmissive state.

14. The apparatus of claim 13 wherein said modulating means is capable of maintaining said liquid crystal shutter in an intermediate state wherein the average transmissivity of said intermediate state is no greater than the transmissivity of said state of high optical transmissivity and no lower than the transmissivity of said state of low optical transmissivity.

15. Apparatus for generating photographic media containing graphics images by moving a shaped light beam of a graphics element over the surface of a photographics recording means, said apparatus including:
   data entry means for entering information corresponding to identity, position and composition of said graphic images to be placed on said photographic media,
   storage means for storing said information,
   processing means for converting said information into output signals representing said identity, position and composition,
   stationary photographic recording means for recording said graphic images on to said photographic media including means for holding said photographic media in position for light exposure, and shutter means for controlling the time and amount of light exposure of said photographic media,
   a light source,
   image generating media having transparent and opaque portions comprising a graphics element silhouette such that light from said light source passes through said silhouette to form a shaped light beam,
   a lens, interposed between said image generating media and said photographic recording means, surrounded by and mounted on an opaque stage moveable along two different linear axes in a plane parallel to the plane of said photographic recording media in response to a third portion of said output signals during the period of time that said shaped light beam impinges upon said photographic recording means to draw said graphics images,
   control means associated with said processing means for controlling said shutter means, and
   means for moving said stage in response to said output signals while light from said light source is exposing said photographic media.

16. The apparatus of claim 15 wherein said shutter means comprises a liquid crystal shutter.

17. The apparatus of claim 16 additionally including modulating means for modulating said liquid crystal shutter between a state of high optical transmissivity and a state of low transmissivity.

18. The apparatus of claim 17 wherein said modulating means is capable of maintaining said liquid crystal shutter in an intermediate state wherein the average transmissivity of said intermediate state if no greater than the transmissivity of said state of high optical transmissivity and no lower than the transmissivity of said state of low optical transmissivity.

19. Apparatus for generating a color slide transparency containing images of alpha-numeric characters, including:
   data entry and storage means for entering and storing information corresponding to identity, color, and position of a plurality of selected ones of said alpha-numeric characters to be placed on said color slide transparency,
   processing means for converting said information into output signals representing said identity, color, and position,
   stationary photographic recording means for recording images of said alpha-numeric characters onto said color slide transparency, including means for holding said color slide transparency in position for exposure,
   shutter means for controlling the time of exposure of said color slide transparency,
   a light source,
   movable image-generating media having transparent and opaque regions, said regions forming silhouettes of at least one set of alpha-numeric characters, said moveable image-generating media being responsive to a first portion of said output signals to position a selected one of said silhouettes such that light from said light source passes through said selected one of said silhouettes to form a shaped light beam,
   a plurality of color filter media, movable into the region between said light source and said stationary photographic recording means beam in response to a second portion of said output signals,
   a lens surrounded by opaque material in the path of said shaped light beam, said lens being moveable along at least two different linear axes in a plane parallel to the plane of said color slide transparency in response to a third portion of said output signals, to position and focus said shaped light beam on a selected portion of said color slide transparency, said opaque stage having an aperture means mounted thereon, said aperture means being configured to open and thereby flood said photographic media with background light when said opaque stage is in a predetermined position,
   control means, associated with said processing means, for controlling said shutter means to produce on said selected area of said color slide transparency an exposed image of said selected alpha-numeric characters from said shaped light beam.

20. The apparatus of claim 19, wherein said moveable image-generating media comprises a media disk having at least one set of alpha-numeric characters disposed at different angular positions along a constant radius of said disk, and further including an opaque aperture disk overlapping said media disk and on an axis parallel to the axis of said media disk, said aperture disk having an aperture located at a radius such that the path of said shaped light beam lies through said aperture, said aperture of a size sufficient to pass said shaped light beam from each one of said set of alpha-numeric characters.

21. The apparatus of claim 19, wherein said moveable imagegenerating media comprises a disk having a plurality of sets of alpha-numeric characters, being disposed at different angular positions along a constant radius of said disk, and further including an opaque aperture disk on the same axis as said media disk, said disk having a plurality of apertures, each one of said apertures being located at a different radius corresponding to the radius at which one of said sets of alpha-numeric characters is disposed along said media disk, each of said aperture being sufficient in size to pass said shaped light beam from the one of the sets of alpha-numeric characters at its radius, said aperture disk responsive to a fourth portion of said output signals to position a selected aperture with respect to a selected one of said sets of alpha-numeric characters.

22. Apparatus for generating a color slide transparency containing images of alpha-numeric characters and graphics images, including:
  data entry and storage means for entering and storing information corresponding to identity, color, and position of a plurality of selected ones of said alpha-numeric characters, and shape, location, and color of selected graphics images, to be placed on said color slide transparency,
  processing means for converting said information into output signals representing said information,
  stationary photographic recording means for recording images of said alpha-numeric characters and said graphics images onto said color slide transparency, including means for holding said color slide transparency in position for exposure,
  shutter means for controlling the time of exposure of said color slide transparency,
  a light source,
  movable image-generating media having transparent and opaque regions, said regions forming silhouettes of at least one set of alpha-numeric characters and graphics elements, said moveable image-generating media being responsive to a first portion of said output signals to position a selected one of said silhouettes such that light from said light source passes through said selected one of said silhouettes to form a shaped light beam,
  a plurality of color filter media, movable into the region between said light source and said stationary photographic recording means beam in response to a second portion of said output signals,
  a lens surrounded by opaque material in the path of said shaped light beam, said lens being moveable along at least two different linear axes in a plane parallel to the plane of said color slide transparency in response to a third portion of said output signals, to position and focus said shaped light beam on a selected portion of said color slide transparency to expose a selected one of said set of alpha-numeric characters, and further to controllably move said shaped light beam during exposure of one of said graphics elements to create a graphics image in a selected region of said color slide transparency, said opaque stage having an aperture means mounted thereon, said aperture means being configured to open and thereby flood said photographic media with background light when said opaque stage is in a predetermined position,
  control means, associated with said processing means, for controlling said shutter means to produce on said color slide transparency an exposed image of said selected alpha-numeric characters and graphics images from said shaped light beam.

23. The apparatus of claim 22, wherein said moveable image-generating media comprises a media disk having at least one set of alpha-numeric characters and graphics elements disposed at different angular positions along a constant radius of said disk, and further including an opaque aperture disk overlapping said media disk and on an axis parallel to the axis of said media disk, said aperture disk having an aperture located at a radius such that the path said shaped light beam lies through said aperture, said aperture of a size sufficient to pass said shaped light beam from each one of said set of alpha-numeric characters and graphics elements.

24. The apparatus of claim 22, wherein said moveable image-generating media comprises a disk having a plurality of sets of alpha-numeric characters and graphics elements, being disposed at different angular positions along a constant radius of said disk, and further including an opaque aperture disk on the same axis as said media disk, said disk having a plurality of apertures, each one of said apertures being located at a different radius corresponding to the radius at which one of said sets of alpha-numeric characters and graphics elements is disposed along said media disk, each of said apertures being sufficient in size to pass said shaped light beam from the corresponding one of the sets of alpha-numeric characters and graphics elements at its radius, said aperture disk responsive to a fourth portion of said output signals to position a selected aperture with respect to a selected one of said sets of alpha-numeric characters and graphics elements.

25. The apparatus of claims 19, 20, 21, 22, 23 or 24, furter including an aperture in said opaque material surrounding said lens, said aperture covered by a shutter which opens when said lens is moved to an extreme point along one axis.

26. Apparatus for generating photographic media containing images of alpha-numeric characters, said apparatus including,
  a light source,
  stationary photographic recording means for recording images of selected ones of said alpha-numeric characters onto said photographic media, including means for holding said photographic media in position for light exposure, and shutter means for controlling the time of light exposure of said photographic media,
  a rotatably mounted media disk containing transparent and opaque regions, said transparent regions forming at least one set of alpha-numeric characters,
  a rotatably mounted aperture disk containing at least one aperture,
  a rotatably mounted color disk, having a plurality of colored filter elements,
  said media disk, said aperture disk, and said color disk being mounted on substantially parallel axes, and overlapping such that light from said light source may pass through a transparent character on said media disk, said aperture, and one of said colored filter elements and impinge upon said photographic media,
  means for separately, controllably rotating said media disk, said aperture disk, and said color disk, in response to control signals, to produce a desired combination of alpha-numeric character and color,
  a lens, mounted on an opaque stage, said stage moveable along two substantially different linear axes in a plane parallel to the plane formed by said photographic media, said lens being located between said photographic media and said media, aperture, and color disks.

27. The apparatus of claim 26 further including an aperture in said opaque stage covered by a shutter which opens when said stage is displaced in a maximum direction along one of said axes.

28. The apparatus of claims 1, 8, or 15 further including an aperture in said opaque stage covered by a shutter which opens when said stage is displaced in a maximum direction along one of said axes.

29. Apparatus for generating an image of alpha-numeric characters on photographic media, said apparatus including:

data entry means for entering information corresponding to identity and position of a plurality of selected ones of said alpha-numeric characters to be placed on said photographic media, storage means for storing said information, processing means for converting said information into output signals representing said identity and position, stationary photographic recording means for recording images of selected ones of said alpha-numeric characters on to said photographic media including means for holding said photographic media in position for light exposure, and shutter means for controlling the time of light exposure of said photographic media, a light source, moveable image generating media having transparent and opaque regions in predetermined areas, said regions forming silhouettes of at least one set of said alpha-numeric characters, said moveable image generating media being responsive to a first portion of said output signals to position a selected one of said silhouettes such that light from said light source passes through said selected one of said silhouettes to form a shaped light beam, a lens, interposed between said image generating media and said photographic recording means, surrounded by and mounted on an opaque stage moveable along two different linear axes in a plane parallel to the plane of said photographic recording media in response to a third portion of said output signals, control means associated with said processing means for controlling said shutter means to produce on said selected area of said photographic media an exposed image of an alpha-numeric character from said shaped light beam, means for bypassing said lens to expose background color on said photographic media.

* * * * *